United States Patent [19]

Schneider

[11] Patent Number: 4,624,069
[45] Date of Patent: Nov. 25, 1986

[54] ROD HOLDER APPARATUS

[76] Inventor: John D. Schneider, 1413 Eton, Perryton, Tex. 79070

[21] Appl. No.: 751,940

[22] Filed: Jul. 5, 1985

[51] Int. Cl.⁴ ..................... A01K 97/08; A01K 97/10
[52] U.S. Cl. ...................................... 43/21.2; 248/514
[58] Field of Search ............... 43/21.2; 248/514, 511, 248/532, 534, 535, 541

[56] References Cited

U.S. PATENT DOCUMENTS

| | | | |
|---|---|---|---|
| 1,198,202 | 9/1916 | Drinkard | 43/21.2 |
| 2,236,078 | 3/1941 | Rohrdanz | 248/42 |
| 2,502,049 | 3/1950 | Kaminski | 248/541 |
| 2,523,356 | 9/1950 | Cherry | 43/21.2 |
| 2,598,021 | 5/1952 | Schwanke | 248/511 |
| 2,704,412 | 3/1955 | Davis | 43/21.2 |
| 2,912,196 | 11/1959 | Johnson | 248/514 |
| 3,570,793 | 3/1971 | Shackel | 43/21.2 |
| 3,941,340 | 3/1976 | Rankins | 248/514 |
| 4,081,115 | 3/1984 | White | 244/5 E |
| 4,198,775 | 4/1980 | Leisner | 43/21.2 |
| 4,529,112 | 7/1985 | Miller | 42/21.2 |
| 4,587,757 | 5/1986 | Lirette | 43/21.1 |

*Primary Examiner*—Nicholas P. Godici
*Assistant Examiner*—Christopher L. McKee

[57] ABSTRACT

A fishing rod holder includes a mount for attachment to an inflatable, floatable tube. A cylindrical rod holder is pivotally attached to the mount with a locking arrangement for securing the selected position of the cylinder rod holder; a flexible strap is attached over the cylindrical rod holder to secure the rod inserted therein from accidental dislodgment during use.

7 Claims, 8 Drawing Figures

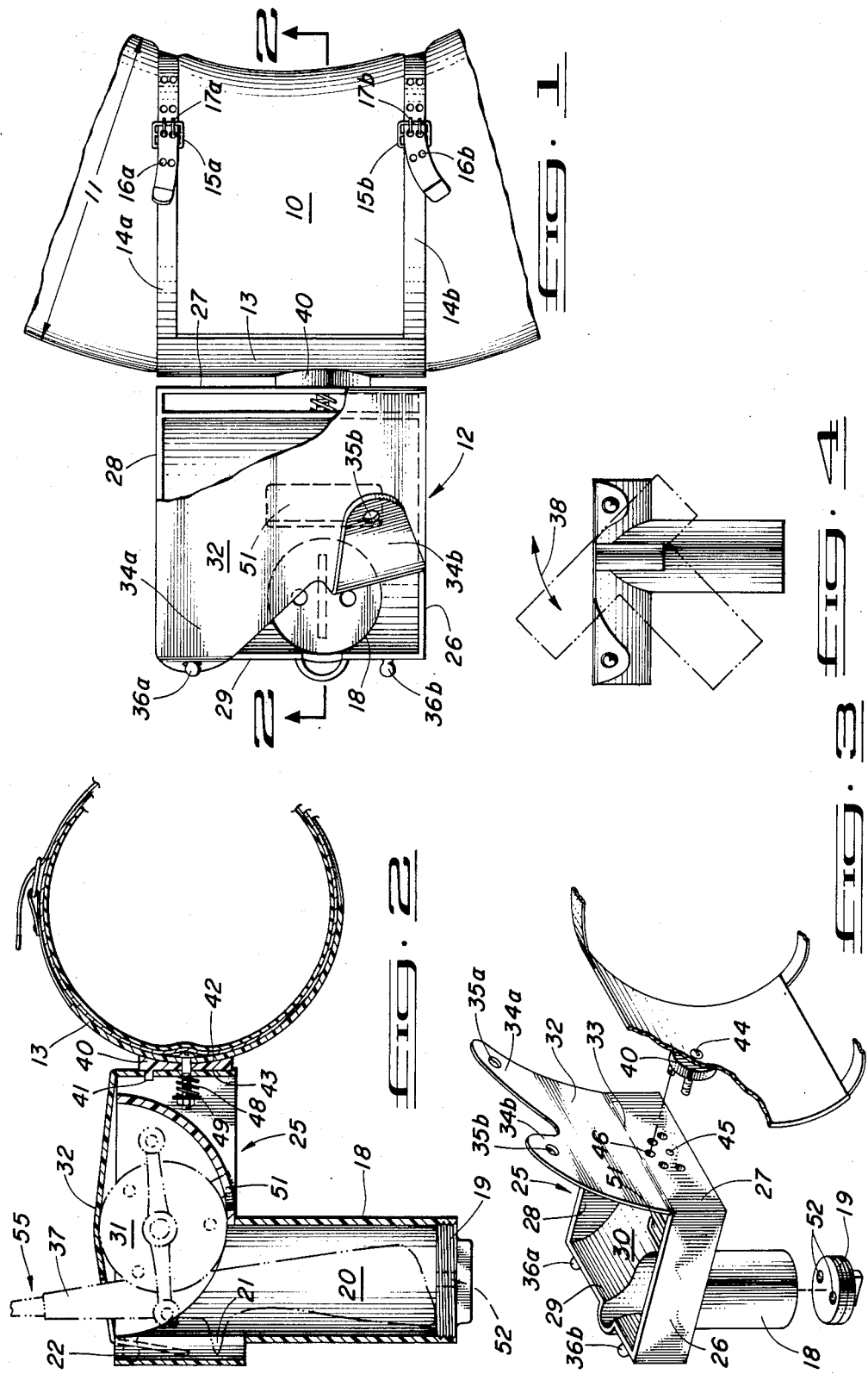

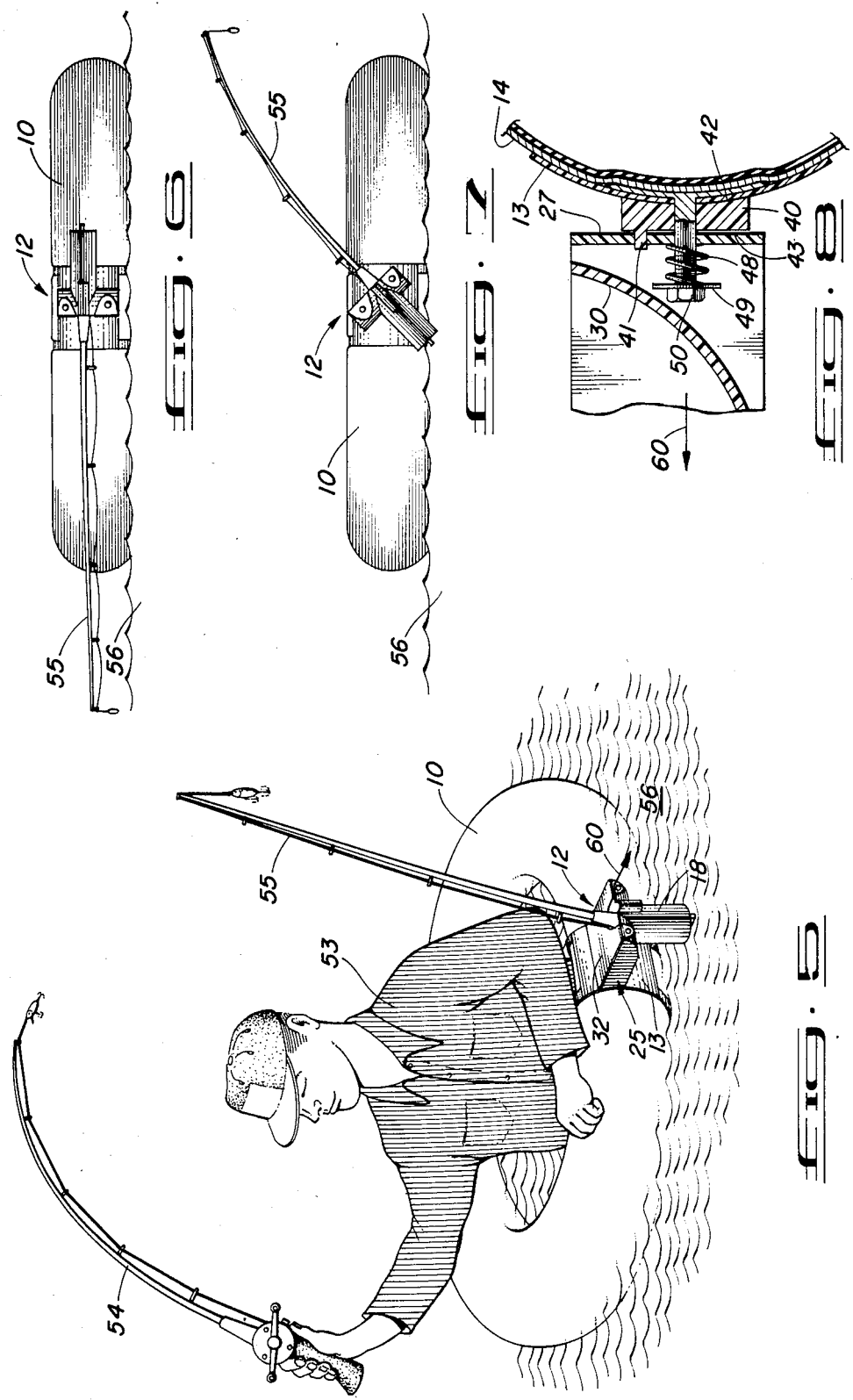

ROD HOLDER APPARATUS

DISCUSSION OF PRIOR ART

U.S. Pat. No. 2,236,070 discloses a fishing rod holder which essentially comprises a pivotal clamp with a clamp means 32 for anchoring the assembly to a boat transom for example. U.S. Pat. No. 4,198,775 illustrates a tubular holder for a fishing rod which has pivotal means 61 and an attachment means 56. The attachment is a "C" Clamp similar to the previously described patent. The closest patent found during the search appears to be U.S. Pat. No. 4,081,115 which illustrates a tubular holder for a fishing pole with means for attaching the tubular member to a mount, and a limiting means for pivoting the fishing pole shown by a slot; the entire assembly is attached to a strap which fits around a person and buckles in a manner to secure the assembly to the person. The above described patented apparatus is different from the subject matter of this invention, because it is used to hold a fishing pole while it is being used and is attached around a person.

BRIEF DESCRIPTION OF THE INVENTION

This invention basically comprises of an apparatus which can be releasably secured around an inflatable, floatable, toroidally shaped apparatus such as an inner tube for a vehicle and is adapted for storing a fishing pole while a second fishing pole is being used. The invention essentially comprises an attachment housing portion which is formed of a tubular portion which has a "C" shaped cross section and an outer and inner surface. A strap is attached to the outer surface which has a length sufficient to extend around the smaller circumference of the inner tube. A tubular support means is formed to receive the handle of the fishing pole and is coupled to the housing through an extension which is formed to receive the reel. A flexible strap is attached over the extension coupling and has a bifurcated end which will permit the strap to pass around the fishing pole and means are then provided on the tubular support for attaching the bifurcated tips of the straps. The assembly also has a pivotal attachment between the extension coupling means and the attachment housing, so that the fishing pole can be rotated out of interference with the use of the second pole. The pivotal attachment generally consists of a pin and a plurality of arcuately spaced holes. A biasing spring permits movement of the attachment by pulling on the extension coupling or the tubular support, which then removes the pin from one of the arcuate holes so that the assembly can be rotated to a second or other selected position. The pin can then be reinserted into another hole thereby locking the assembly in a fixed position.

BRIEF DESCRIPTION OF THE FIGURES

Referring to the FIGURES;

FIG. 1 illustrates the top view of the assembly attached to a toroidal and floatable member, such as an inner tube, with a partially cut away attachment strap showing the assembly under the attachment strap;

FIG. 2 is a side view cross section of the apparatus of FIGURE taken through 2—2;

FIG. 3 is an exploded view of the apparatus illustrated in FIGS. 1 and 2;

FIG. 4 illustrates in dotted lines one of the alternate positions the assembly can be moved to if desired;

FIG. 5 is a view showing the assembly in the water attached to a floatable toroidal apparatus;

FIG. 6 shows one position of the apparatus storing the fishing pole in a substantially horizontal position;

FIG. 7 shows an alternate position for storage the fishing pole, and

FIG. 8 is a detailed drawing of the pivotal attachment coupling the holding apparatus to the attachment apparatus.

DETAILED DESCRIPTION OF THE INVENTION

A common sport is tube fishing. In this sport a fisherman generally attaches himself to a floatable toroidal apparatus, such as a inner tube of a vehicle. The inner tube includes a net extending over the inner tube and across the center opening and has a pair of openings, to receive the legs of the fisherman. The net arrangement (not illustrated) then supports the fisherman so that he is able to float or partially float on the surface of the water. The apparatus provides an inexpensive, very transportable method for a fisherman to be able to travel on the surface of the water and fish. One of the problems inherent in such an apparatus, however, is the storage of additional poles for selected fishing. These additional poles are occasionally falling in the water and getting lost or becoming entangled in the brush around the area where the fisherman is fishing, thereby making the process of fishing less desirable. This invention solves the above problems, by providing a convenient simple method for storing the fishing poles, locking the fishing poles from accidental dislodgment, and storing the poles out of the way of the fisherman during the fishing process.

Referring to FIG. 1, a toroidally shaped floatable member or vehicle inner tube 10, has a smaller diameter 11. A fishing pole storage apparatus, generally referred to by arrow 12, essentially comprises an attachment housing 13 which consists of a portion of a tube which has been cut to form a "C" shaped cross-section. Attached to housing 13 is a pair of straps 14A and 14B which include buckles 15A and 15B; also straps 14A and 14B are provided with a plurality of holes 16A and 16B respectively which are useful for locking the straps through tongues 17A and 17B.

A tubular support means 18 includes a bottom 19, which may be glued or screwed as illustrated into tubular support means 18. The diameter of tubular support means 18 is sufficient to receive the standard handle 20 of a fishing pole. Clearance for the fingerhold 21 is provided by a tubular portion extension 22, which is attached to the outer circumference of tubular support means 18 for receiving the fingerhold 21.

Coupling tubular support means 18 to attachment housing 13 is an extension coupling means referred to by arrow 25. Extension coupling means 25 (see FIG. 3) essentially comprises a rectangular shaped box portion having sides 26, 27, 28, and 29, with an arcuate bottom 30 which bottom is attached to tubular support means 18. The shape of bottom 30 is generally configured so that the reel 31 (see FIG. 32) can be accommodated within the extension coupling means. It is obvious, of course, that bottom 30 does not have to be arcuately shaped, but said shape will better accommodate and retain the reel 31.

A flap member 32 is attached along edge 33 to side 27. Flap 32 contains a bifurcated tip comprising portions 34A and 34B, which will permit flap 32 to pass on either side of fishing pole rod portion 37. Bifurcated tips 34A and 34B likewise contain openings 35A and 35B respectively which fit over pins 36A and 36B respectively which are attached to side 27. Holes 35A and 35B are sized to pass over and be secured by pins 36A and 36B. Flap 32 is preferably made of elastic streachable material, such as rubber. It obvious, of course, that other plastics can be used. It is preferable that flap 32 be made of elastic since it can thereby accommodate several reel sizes without having to be replaced with a larger or smaller flap.

The pivotal attachment of extension coupling means 25 to attachment housing 13 is illustrated by Referring to FIGS. 2, 3, and 8. The pivotal attachment essentially comprises a raised portion 40, which has a pin 41 secured to its outer surface. Raised portion 40 may be secured in any way to attachment housing 13, by gluing, riveting, screwing or any other usual means. Raised portion 40 has one surface 42 arcuately shaped to accommodate the curvature of attachment housing 13; and the other surface 43 is flat. The mating side 27 of extension coupling means 25 is secured to attachment housing 13 against flat surface 43 by a pin 44 which passes through an opening 45 inside 27 and accommodates a biasing spring 48 with a washer 39 and nut 50, securing the assembly. A pair of drain holes 51 and 52 may be provided in the assembly for the removal of water when the tubular portion 18 and the extension coupling means 25 is in a position so that it may accumulate water inside the unit.

OPERATION

Referring to FIGS. 4, 5, 6, and 7 the operation of this invention can be clearly understood.

In order to install the tubular support means to the vehicle inner tube for use, buckles 15A and 15B are released from holes 16A and 16B if they are previously connected; and the attachment housing is pushed against the outer portion of the inflated inner tube. Once securely positioned strap 14A is wrapped around the diameter of the tube and pushed through buckle 15A. Strap 14A is then pulled until the strap is tightly secured against the diameter of tube 10, the tongue is then pushed through the holes in order to maintain the aforementioned pressure. Strap 14B is then positioned in the same manner as 14A. The above will then properly position the holder 12 fishing pole storage apparatus 12 firmly against the inflated tube 10. The tube is then placed in water 56 for use in the usual manner of tube fishing.

A fisherman 53 generally will fish with two poles 54 and 55; during the use of pole 54, pole 55 is stored in fishing pole storage apparatus 12, by inserting the handle 20 into tubular support means 18 until it strikes bottom 19. Reel 31 will be positioned so that it is located in extension coupling means 25 with the fingerhold 21 being received by extension tube portion 22. Flap 32 is then streached over reel 31 with hole 35A placed over pin 36A and hole 35B place over pin 36B. Fishing pole 55 is then firmly secured in holder 12. Once the fishing rod or pole is secured in fishing pole storage apparatus 12, the fishing pole may then be moved out of the way, as illustrated in FIG. 6 or FIG. 7, by pulling in the direction of arrow 60 (See FIG. 5 or FIG. 8). Pulling in the direction 60 separates or removes pin from holes 36, the extension coupling means 25 can then be rotated arcuately about screw 44 until a desired position of the pole 55 is realized whereupon extension coupling means 25 is then released. Spring 48 will then cause a bias against side 27 forcing pin 41 back into one of the holes 46. If for example the pin should strike a portion between hole 46, then the extension coupling means 25 may be merely slightly rotated while spring 48 is applying bias towards side 27, so that pin 41 will drop into one of the holes 46.

The holder 12 can also be used as an additional fishing pole, by positioning as illustrated in FIG. 7. The positioning of the holder as shown in FIG. 7 can be easily accomplished following the procedure set out above.

In case of water accumulation in the holder; it is obvious that it can be easily drained through through drain holes 51 or 52.

CONCLUSION

A unique apparatus has been disclosed for storing an alternate fishing pole during the sport of tube fishing. The fishing pole storage apparatus provides a means for permanently securing the fishing pole, and storing it out of the way during the fishing process. It also provides a unique method for mounting a fishing pole on a tube fishing apparatus so that it can be used alternately for second pole if desired. It is obvious that changes can be made in the particular arrangement of the tubular housing and the attachment means and mounting means and still be well within the scope of this invention as described. For example, portion 22 can be formed by merely making a slot in tubular portion 18. Other configurations can be made for the reel storage portion of the apparatus; also various configurations can be made in the flap 32 for retaining the reel in the holder 12 during the time the reel is being stored. Such changes are well within the spirit of this invention as defined in the specifications and appendant claims.

What I claim is:

1. Apparatus for releasably securing a fishing rod having a handle and reel attached thereto, to an inflated, floatable, toroidally shaped apparatus comprising:
   a. an attachment housing portion formed of a tubular portion having a "C" shaped cross-section and having an outer and inner surface;
   b. attachment means mounted on the outer surface of said attachment housing portion;
   c. tubular support means for receiving said handle longitudinally therein;
   d. extension coupling receptacle means positioned between and connecting said tubular support means to said attachment means and formed to cooperate with said tubular support means, to receive said reel therein and,
   e. strap means attached to said attachment housing portion so that when said inner surface of said attachment housing portion is oriented to mate with the outer surface of said toroidally shaped apparatus, said strap means can extend around and thereby secure said attachment housing portion to said toroidally shaped apparatus.

2. Apparatus as described in claim 1 including a rod retaining means having one end attached to said extension coupling means and extending over said reel, including a bifurcated end opposite said attachment end for extending around said rod and means for securing said bifurcated end edge to said tubular support.

3. Apparatus as described in claim 1 wherein said extension coupling means includes pivotal apparatus means for rotatably connecting said extension coupling means to said attachment means.

4. Apparatus as described in claim 3 wherein said pivotal apparatus means includes a connecting pin; biasing spring mounted around said connecting pins, a plurality of spaced openings arcuately spaced around said attachment pin, and a cooperating pin means mounted to insert into one of said holes; whereby when said extension coupling means is pulled along the axis of said connecting pin, said connecting pin means will pull out of said opening thereby permitting rotation of said extension coupling means with respect to said attachment housing and upon release, said biasing spring will force said extension coupling means toward said attachment means.

5. In combination with an inflated vehicle inner tube, a holder for a fishing rod and reel comprising:
 (a) an attachment housing formed of a tubular portion having an outer and inner surface;
 (b) strap means connected to said attachment portion of said housing and adapted to pass around said inflated portion of said inner tube for securing said attachment housing against said inner tube;
 (c) tubular support means for receiving a handle of said fishing rod longitudinally therein;
 (d) extension coupling receptacle means positioned between and connecting said tubular support means to said attachment means, said extension coupling means sized to receive therein said reel on said fishing rod; and
 (e) flap means secured to said extension coupling means for covering and securing said reel to said extension coupling means.

6. Apparatus as described in claim 5 wherein said extension coupling means is pivotally connected to said attachment housing.

7. Apparatus as described in claim 6 wherein said pivotal connection includes a connecting pin, biasing spring, a plurality of spaced openings arcuately around and spaced around said attachment pin, and a cooperating pin means mounted to insert into one of said holes; whereby when said extension coupling means is pulled along the axis of pivotal connection means, said cooperating pin means will pull out of said opening permitting rotation of said extension coupling means with respect to said attachment housing and upon release, said biasing spring will pull said extension coupling means toward said attachment means.

* * * * *